Figure 1:
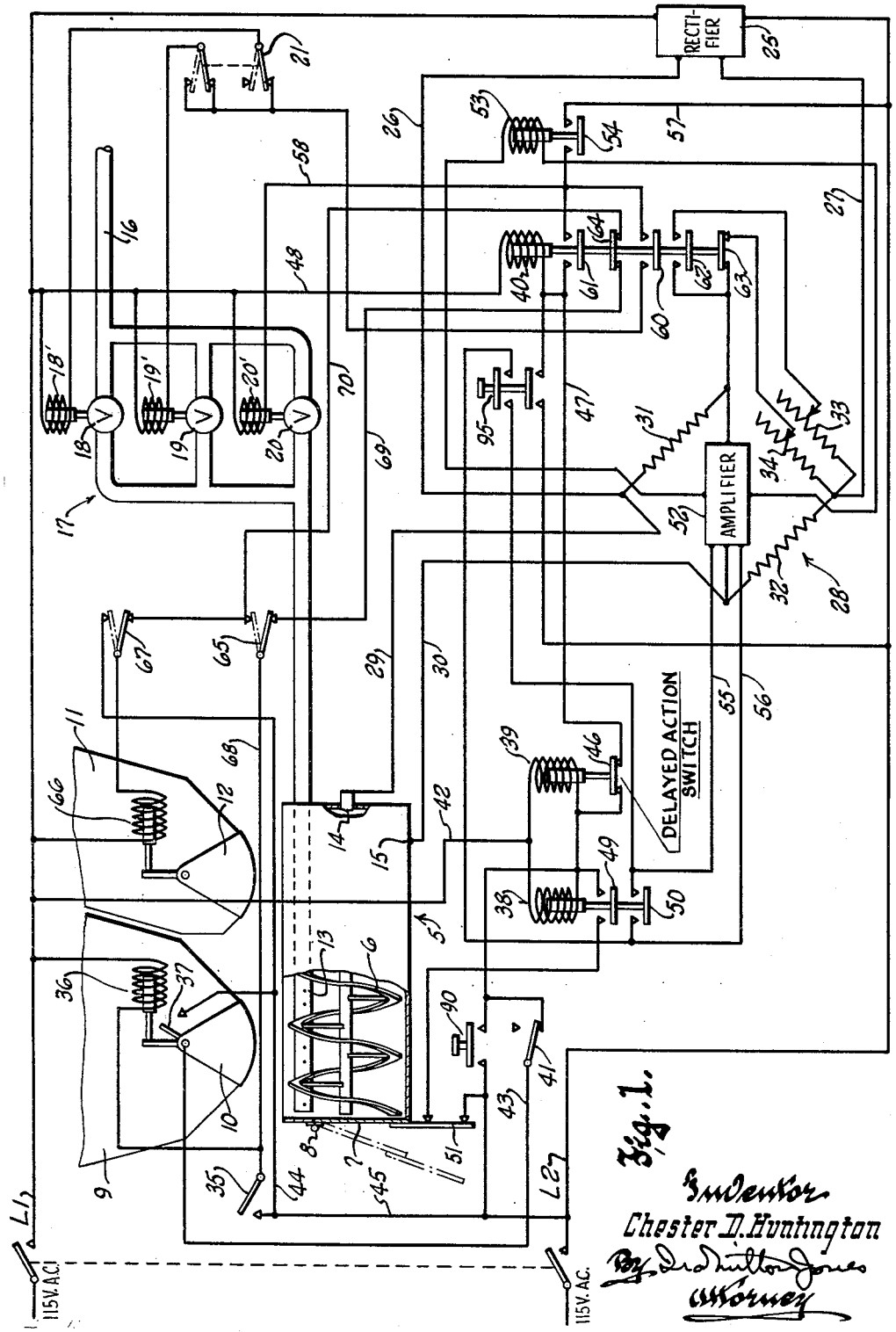

April 21, 1964  C. D. HUNTINGTON  3,129,928
WATER FEED CONTROL SYSTEM FOR CONCRETE MIXERS
Filed June 16, 1961  2 Sheets-Sheet 1

Inventor
Chester D. Huntington
By
Attorney

April 21, 1964    C. D. HUNTINGTON    3,129,928
WATER FEED CONTROL SYSTEM FOR CONCRETE MIXERS
Filed June 16, 1961    2 Sheets-Sheet 2
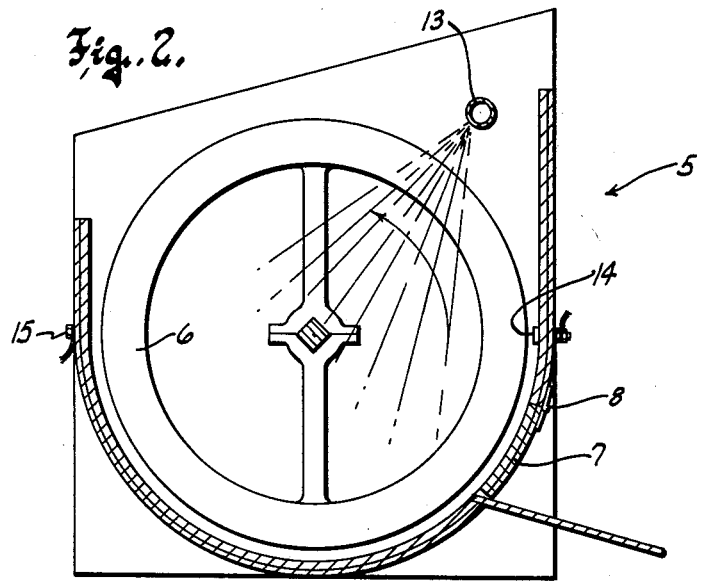
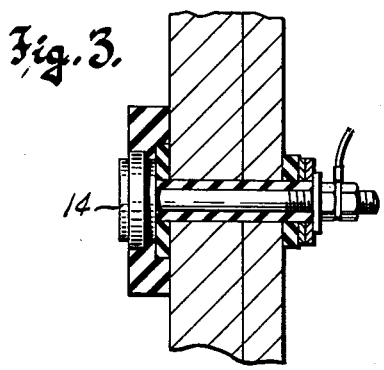
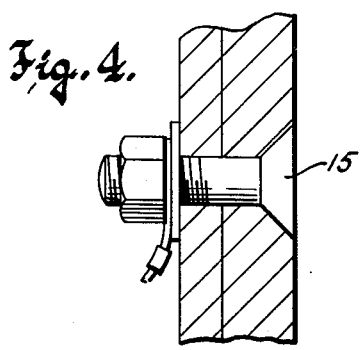
Inventor
Chester D. Huntington
By
Attorney

United States Patent Office 3,129,928
Patented Apr. 21, 1964

3,129,928
WATER FEED CONTROL SYSTEM FOR CONCRETE MIXERS
Chester D. Huntington, Waukesha, Wis., assignor to Butler Bin Company, Waukesha, Wis., a corporation of Wisconsin
Filed June 16, 1961, Ser. No. 117,689
3 Claims. (Cl. 259—154)

This invention relates generally to controls for concrete mixing plants, and refers particularly to a control for metering the delivery of water into a concrete mixer.

The need for accurately controlling the delivery of the various ingredients into the mixer of a concrete mixing plant, is becoming ever more acute; and coupled with this need for greater accuracy is a demand for faster mixing cycles. The present invention goes a long way toward meeting these two demands, by providing an improved system for metering the delivery of water to a batch of aggregates being mixed in a concrete mixer, which is characterized by extremely fast delivery of the water without however, sacrificing accuracy in the regulation of the amount of water delivered.

The invention utilizes the principle of controlling the admission of water into the mixture by continually measuring the electrical conductivity of the mixture, which of course increases as the mixture gets wetter, and shutting off the water flow when the correct amount has been delivered, by means of electrically responsive valve actuating means activated by a control circuit connected with a pair of contacts positioned to be exposed to the mixer contents. While this principle has been employed before, its use in the past has not been practicable where rapid delivery of the water, as well as accuracy in the delivered amount was required. The only way it could be done before was to use two independent, duplicate systems, one to control fast flow of the major percentage of the required water, and the other to "dribble" in the rest of the water. The cost involved in such duplication was, of itself, a sufficient and effective deterrent to its use.

This invention eliminates the need for duplicate control instrumentalities, and thus overcomes the economic handicap of prior attempts to utilize the conductivity of the mixture as the governing factor in a water feed control system, and takes full advantage of the many virtues of this approach to the problem.

The purpose and object of the invention is thus to provide a simple, inexpensive practical control system which employs but a single pair of contacts positioned to be exposed to the mixer contents and which comprises one relatively simple control system responsive to the signal or information derived from this one pair of contacts, to:

(1) Effect very rapid delivery of all but a predetermined small percentage of the required water;
(2) Throttle the flow to a very slow rate; and
(3) When exactly the right amount of water has been delivered, shut off the flow.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 1 is a diagrammatic illustration of the complete control system of this invention;
FIGURE 2 is a cross sectional view through the mixer which is of the pug mill type;
FIGURES 3 and 4 are detail cross sectional views through the two electrical contacts which are positioned to be exposed to the contents of the mixer, and adapted to be electrically bridged by the mixer contents with a resistance depending upon the wetness of the mixture.

Referring particularly to the accompanying drawings, the numeral 5 designates generally a concrete mixer which in the present instance is illustrated as being of the pug mill type, and hence has an open top through which the dry aggregates may be charged into the mixer.

A rotating agitator unit 6 operates in the mixer to effect the mixing action, and a discharge gate 7 hingedly mounted at 8, upon being opened, allows the contents of the mixer to be discharged.

In actual practice, the discharge gate is located in the side of the mixer—as shown in FIGURE 2—but for convenience and clarity, it is shown at one end of the mixer in the diagrammatic illustration of FIGURE 1.

Measured quantities of sand and gravel contained in a hopper 9, are charged into the mixer upon opening of an aggregate gate 10. Likewise, a measured quantity of cement contained in a hopper 11 is charged into the mixer upon opening of a cement gate 12. Water is introduced into the mixer preferably in a spray issuing from ports in a water supply pipe 13 which extends longitudinally of the mixer along the top thereof, and to which water is delivered from a pressurized source thereof under the control of the system which forms the subject matter of this invention.

All of the dry aggregates may be simultaneously charged into the mixer—or, if desired, the sand and gravel may be introduced before the cement and pre-wet before the cement enters the batch. The control system, as will be hereinafter brought out, may be set to accommodate either of these procedures.

As noted hereinbefore, it is the electrical conductivity of the mixture undergoing mixing which governs the admission of the water, and to make this possible, two contacts 14 and 15 are positioned to be exposed to the contents of the mixer and to be electrically bridged by the mixer contents with a resistance which decreases as the mixture becomes wetter.

The contact 14 is electrically insulated from the wall of the mixer, as clearly shown in FIGURE 3, but the contact 15 may be grounded thereto, as shown in FIGURE 4; and as shown in FIGURE 2, the contacts are preferably at diametrically opposite sides of the mixer.

Water is delivered to the pipe 13 from a source thereof represented in the diagrammatic disclosure of FIGURE 2, by the supply pipe 16, either at a fast flow rate or a slow flow rate. To control the rate at which the water is delivered, valve means indicated generally by the numeral 17 are connected between the supply pipe 16 and the delivery pipe 13. This valve means may be of any conventional design, as long as it is capable of being set or adjusted to deliver water at a relatively fast flow rate—for instance in the neighborhood of 25 or more gallons per minute—then actuated to throttle the flow to something on the order of 5 gallons per minute, and then closed to shut off all flow.

For purposes of illustration, the valve means have been shown as three solenoid actuated valves 18, 19 and 20, connected in parallel between the source 16 and the discharge pipe 13. Further for purposes of illustration, the valves 18 and 19 may be considered as delivering 12 gallons per minute each, when open; and the valve 20 as supplying 5 gallons of water per minute to the mixer when the valve 20 alone is open. When all three valves are open, water is delivered at a rate of 29 gallons per minute.

By cutting either the valve 18 or 19 out of the system, i.e. leaving it closed, the fast flow rate can be reduced to 17 gallons per minute; and to enable such disconnection of one of the valves (specifically the valve 18) a selector switch 21 is provided which, when in its dotted line position shown in FIGURE 1, opens the circuit of the solenoid 18' of the valve 18.

The valves 18, 19 and 20, in the embodiment of the invention illustrated, are of the normally closed type and are open only when their respective solenoids are energized. With the selector switch 21 in its full line position (in FIGURE 1) so that the valve 18 is operative, the solenoids of all three valves should be energized when the system is turned on and in operation, but not until at least the sand and gravel have been charged into the mixer.

The system is turned on by closure of a main A.C. switch, illustrated at the extreme left in FIGURE 1. This switch connects the lines L1 and L2 with a suitable source of alternating current, and energizes a rectifier 25 which is connected across lines L1 and L2 at the extreme right in FIGURE 1. The rectifier delivers direct current by means of lines 26 and 27 to the vertically opposite points of a bridge circuit, indicated generally by the numeral 28.

One leg of the bridge circuit 28 has the contacts 14 and 15 connected in series therewith by lines 29 and 30. The adjacent legs 31 and 32 of the bridge are provided by suitable fixed resistances, and the fourth leg comprises either one or the other of two adjustable resistors 33 and 34. In a sense, therefore, the bridge circuit 28 may be considered to be two separate bridges, but it is more convenient to regard it as a single bridge, the fourth leg of which is provided by one or the other of the adjustable resistors 33 and 34.

Since as will be hereinafter more fully described, the resistance of the current path connecting the contacts 14 and 15 and provided by the contents of the mixer may be balanced against one or the other of the adjustable resistors (33 or 34), the bridge provides means by which the same signal, i.e. the electrical resistance between the contacts 14 and 15 may be used to terminate the admission of water into the mixer at the fast flow rate when a predetermined major portion of the required water has been delivered, and to terminate flow into the mixer at the slow flow rate when the correct amount of water has been delivered to the mixer.

It follows, of course, that to achieve this purpose, the adjustable resistor 33 must be set to cause the bridge circuit means to "null" or come into balance when the resistance across the contacts 14 and 15 is that which obtains when the preselected major portion of the required water, for instance 85 or 90 percent thereof, has been delivered to the mixer; and the other adjustable resistor 34 must be set to effect a balanced condition in the bridge when the resistance across the contacts 14 and 15 is that which obtains when the right amount of water has been delivered to the mixer.

With these objectives in mind and assuming that the main line switch has been closed so that the system is operative, and assuming also that the measured quantities of sand and gravel and cement have been delivered to the hoppers 9 and 11, respectively, the cycle may be initiated by closure of a cycle-starting switch 35. With the closure of this switch, the solenoid 36 which controls the aggregate gate 10, is energized, thereby swinging the gate 10 to its open position and closing a switch 37. The circuit for the energization of the solenoid 36 may be readily traced from line L1 to L2 through the switch 35. Obviously, with the opening of the gate 10 the sand and gravel in the hopper 9 drops into the mixer 5.

Closure of the switch 37 also effects energization of solenoids 38, 39 and 40, each of which controls one or more switches to be described. Attention is directed to the fact that the circuits for the energization of these solenoids pass through a switch 41 by which the system may be set for automatic operation as it is in FIGURE 1, or for manual operation.

The circuit for the energization of the solenoids 38—39, beginning with line L1, may be traced along conductor 42, conductor 43 in which the switch 41 is located, back to switch 37 and from there through conductors 44 and 45 back to line L2.

The circuit for energization of the solenoid 40 is completed through a normally closed switch 46 which is opened after a predetermined time interval by the solenoid 39. As will be readily apparent, the switch 46 has one side thereof connected with the conductor 43, and its other side connects through conductor 47 with one side of the solenoid 40, the opposite side of the solenoid being connected by conductor 48 directly to line L1.

With energization of the solenoid 38, two switches 49 and 50 close. The former is a holding switch for the solenoids 38 and 39 to maintain the same energized independently of the aggregate gate controlled switch 37, so that opening of the latter as a result of reclosure of the gate 10 does not result in de-energization of the solenoids 38 and 39.

Note, however, that the holding switch 49 is in series with a switch 51, which is controlled by the discharge gate 7 of the mixer, and remains closed as long as the gate 7 is closed but opens concomitantly with the opening of the discharge gate. It is the opening of the switch 51 which terminates the cycle, as will appear hereinafter.

Closure of the switch 50 in response to energization of the solenoid 38, renders an amplifier 52 operative to deliver current to the solenoid of a sensitive relay 53. The input terminals of the amplifier 52 are connected across the horizontally opposite corners of the bridge circuit as shown, but the amplifier does not deliver current unless a control circuit including conductors 55 and 56 is closed. This is done by closure of the switch 50.

The switch 54 of the sensitive relay is connected in series circuit with the solenoid 20' of the valve 20; the circuit being through conductor 57, which leads from line L2, conductor 58 which extends from switch 54 to solenoid 20', and through conductor 48 back to line L1.

The switch 54 is also connected in series with the solenoids 18' and 19' of the valves 18 and 19, but through a switch 60, which is one of a group controlled by the solenoid 40. Energization of the solenoid 40 also closes switches 61 and 62, and opens switches 63 and 64.

With the closure of the switch 62 and the opening of the switch 63, the fast flow rate adjustable resistor 33 is connected into the bridge circuit, and the slow flow rate adjustable resistor 34 is disconnected therefrom. In other words, by the energization of the solenoid 40, the adjustable resistor 33 is made the fourth leg of the bridge.

Since current is delivered by the amplifier whenever the bridge circuit 28 is not in balance (providing switch 50 is closed) and inasmuch as the resistance across the contacts 14 and 15 at the start of the cycle is practically infinite, there being no water in the mixer, the bridge is obviously unbalanced and, as a result, the amplifier delivers current and the relay switch 54 is closed. Thus, with the closure of the switch 60 which takes place the instant the solenoid 40 is energized as a result of closure of the cycle starting switch 35, all three valves 18, 19 and 20, are opened by the energization of their respective solenoids 18', 19' and 20', and water is delivered to the mixer at the maximum flow rate, to pre-wet the sand and gravel.

The time delay switch 46 remains closed only a brief interval after energization of its solenoid 39. Hence, a holding circuit must be established to maintain the solenoid 40 energized. This is the purpose of the switch 61 which is closed by the energization of the solenoid. It should be noted, however, that the holding circuit for the solenoid 40 depends upon the switch 54 being closed—since this switch 54 is connected between the switch 61 and line L2.

The solenoid of the relay 53 remains energized as long as the amplifier puts out current, and this condition obtains as long as the bridge circuit 28 is not balanced. However, with the entry of water into the mixer, the resistance across the contacts 14 and 15 steadily decreases, and when it reaches the value at which it balances the resistance of the fast flow rate adjustable resistor 33, the bridge will be in balance. As the bridge balances or nulls, the relay 53 becomes de-energized and allows its switch 54 to open, which in turn effects de-energization of the solenoid 40, allowing the switches 60, 61 and 62 to open and reclosing the switches 63 and 64.

Opening of the switch 60 effects de-energization of the solenoids 18' and 19' providing the selector switch 21 is in its full line position shown, and only the solenoid 19' if the switch 21 is in its dotted line position. This, of course, effects closure of the valves 18 and 19 so that water is delivered to the mixer only through the valve 20 at the slow flow rate, providing that the sensitive relay 53 is energized so that its switch 54 is closed, since as it will be recalled, the circuits through which the solenoids of all of the valves are energized includes the switch 54.

To enable the system to operate in the manner thus far described, i.e. pre-wetting the sand and gravel before the cement is charged into the mixer, a selector switch 65 is provided. If this switch 65 is in its dotted line position, the circuit for the solenoid 66 which controls opening of the cement gate 12, is closed concomitantly with energization of the solenoid 36 so that both aggregate and cement gates are opened upon closure of the start-cycle switch 35. In this case, the circuit for the cement gate solenoid 66 would be from line L1 through the solenoid, then through a manual cement discharge switch 67, the dotted line position of the switch 65, conductor 68, the switch 35, and conductor 45 to line L2.

However, with the pre-wet selector switch in its full line position, energization of the solenoid 66 does not take place until after the bridge circuit balances in consequence of the predetermined major portion of the water having been delivered to the mixer at the fast flow rate. To this end, the selector switch 65 is connected in series with the switch 64 through line 69 and the manual cement discharge switch 67 is connected through line 70 with the other side of the switch 64. Since the switch 64 opens immediately upon closure of the switch 35, it follows that the circuit for the solenoid 66 is open at the switch 64 and remains open until the solenoid 40 becomes de-energized.

With the de-energization of the solenoid 40 in consequence of the resistance across the contacts 14 and 15 balancing the resistance to which the adjustable resistor 33 has been set, the switch 54 recloses and this completes the circuit for the solenoid 66, through the then closed cycle starting switch 35. The cement gate 12 now opens and the measured quantity of cement enters the mixer.

De-energization of the solenoid 40 also disconnects the fast flow rate adjustable resistor 33 and connects the other adjustable resistor 34 into the bridge circuit, thereby again throwing the bridge out of balance and effecting energization of the relay 53 and closure of its switch 54.

With the sensitive relay 53 again energized, the solenoid 20' of the valve 20 is energized and the valve 20 opened to admit water at the slow rate of 5 gallons per minute. The admission of water at this slow rate continues until the resistance across the contacts 14 and 15 balances the resistance at the adjustable resistor 34, whereupon the bridge circuit comes into balance and effects de-energization of the relay 53. Nothing further occurs at this point, except that mixing of the batch continues, and if perchance its moisture content drops below the required amount before the gate 7 is opened and the batch discharged, the bridge circuit will be again unbalanced and, as a result, the sensitive relay 53 will be energized to close its switch 54 and effect reopening of the valve 20 to admit water at the slow rate.

Since it is the slow rate of flow which is stopped to terminate the delivery of water to the mixer, it is obvious that accuracy is far greater than if the stoppage had to take place while the water was being delivered at the high flow rate.

With the opening of the switch 51 as a result of the gate 7 being opened to discharge the mixer contents, the circuit for the solenoid 38 is broken and, as a result, the switch 50 opens, thus turning off the output of the amplifier, and this in turn keeps the system inoperative until the cycle starting switch 35 is opened to allow the aggregate gate and the cement gate to close, whereupon the cycle may be repeated. Although the manner in which the switch 35 is closed forms no part of this invention, it should be understood that this could be done automatically as for instance, in response to the weight of the aggregates and cement in their respective hoppers 9 and 11 reaching a predetermined value so that the entire operation is automatic.

To enable the system to be manually started, a manual start switch 90 is provided. This switch 90 is in parallel with the switch 37 and, hence, its closure effects energization of the solenoids 38, 39 and 40 in the manner hereinbefore described.

If for some reason it is desired to manually control the delivery of water to the mixer, this may be done by closure of a manual water start switch 95. Closure of this switch connects the solenoid 40 across the lines to energize the same, and connects the conductors 55 and 56 to render the amplifier operative.

Finally, as already indicated, a manual cement discharge switch 67 is provided, which upon being moved to its dotted line position, effects energization of the solenoid 66 and opening of the cement gate 12.

From the foregoing description taken in connection with the accompanying drawings, it will be readily apparent to those skilled in this art, that this invention provides a relatively simple water feed control for cement mixers which, in one relatively inexpensive unit, combines the advantages of rapid delivery of the water with accurate control of the total quantity fed to the mixer, and that therefore this invention is well adapted for use in cement block plants and others of similar type where a fast cycle is essential to economically successful operation.

What is claimed as my invention is:

1. A water feed control system for feeding all but a final small percentage of the required amount of water into a batch of dry aggregates in a concrete mixer, at a fast flow rate, feeding the remainder of the required water into the batch at a slow flow rate, and accurately terminating the flow of water into the mixer when the correct amount has been fed to the batch, said system comprising: means to feed water from a source thereof into the mixer including valve means by which water may be admitted into the mixer at either a pre-selected fast or slow flow rate; a single pair of contacts positioned to be electrically bridged by the contents of the mixer with a resistance which decreases as the mixer contents become wetter; a bridge circuit having two fixed legs, a variable leg which has said pair of contacts connected in it so that the conductivity of the mixer contents between said contacts determines the resistance of said variable leg, and a fourth leg which comprises one or the other of two adjustable resistors by one of which the bridge circuit may be adjusted to balance when the admission of water at the fast flow rate should be stopped, and by the other of which the bridge circuit may be adjusted to balance when the amount of water in the batch is correct; means operatively connected with the bridge circuit and responsive to the attainment of a balanced condition therein when its fourth leg comprises the first of said adjustable resistors to effect actuation of the valve means to stop fast flow of water into the mixer and to substitute the second resistor for said first resistor in the fourth leg of the bridge circuit; and means connected with said bridge circuit and responsive to the attainment of a balanced condition therein when its fourth leg comprises the second adjustable resistor, to effect closure of the valve means and termination of all flow of water into the mixer.

2. The combination with a concrete mixer, means including an aggregate gate for charging a measured quantity of sand and gravel into the mixer, and means including a cement gate for charging a measured quantity of cement into the mixer of: means to feed water from a source thereof into the mixer including fast and slow flow rate valve means connected in parallel between the source and the mixer; electrically responsive valve controlling means to effect opening and closing of said fast and slow rate valve means; means to effect opening of the aggregate gate; means rendered operative concurrently with the opening of the aggregate gate and connected with said electrically responsive valve controlling means to effect opening of the fast flow rate valve means so that water enters the mixer at a fast flow rate along with sand and gravel; a single pair of contacts positioned to be electrically bridged by the contents of the mixer with a resistance which decreases as the mixture gets wetter; electrical sensing means connected with said pair of contacts and with the valve controlling means in consequence of opening of the aggregate gate to effect closure of the fast flow rate valve means when the resistance across said contacts drops to a value at which a predetermined major percentage of the required water has been supplied to the mixture; means connected with said sensing means and activated by response thereof, to effect opening of the cement gate substantially concurrently with closure of the fast flow rate valve means so that the cement enters the mixer when entry of water at the fast flow rate terminates; a second electrical sensing means to effect closure of the slow flow rate valve means when the resistance across said contacts is that at which the required amount of water has been supplied to the mixture; and means under control of the first sensing means to disconnect the contacts from it and connect them with the second sensing means in consequence of the resistance across the contacts dropping to said value at which a predetermined major percentage of water has been supplied to the mixture.

3. A water feed control system for feeding all but a final small percentage of the required amount of water into a batch of dry aggregates in a concrete mixer at a fast flow rate, feeding the remainder of the required water into the batch at a slow flow rate, and accurately terminating the flow of water into the mixer when the correct amount has been fed to the batch, said system comprising: a single pair of contacts positioned to be electrically bridged by the contents of the mixer with a resistance which decreases as water is added to the batch; means to feed water from a source thereof into the mixer including valve means by which water may be admitted into the mixer at either a fast or a slow flow rate; electrically responsive valve controlling means operatively connected with said valve means to effect actuation of the valve means; a first resistance-sensitive control circuit means including a first adjustable resistor, connected with said pair of contacts and with said electrically responsive valve controlling means to actuate the latter to effect admission of water into the mixer at the fast flow rate when said control circuit means is turned on and providing the resistance across the contacts is greater than a predetermined value as determined by the setting of said first adjustable resistor, and to effect reduction in the flow rate of the water entering the mixer to said preselected slow flow rate in consequence of the resistance across said contacts dropping to said predetermined value; a second resistance-sensitive control circuit means including a second adjustable resistor, connected to operate through said valve controlling means and to effect complete closure of the valve means and cessation of all flow into the mixer in consequence of the resistance across the contacts dropping to a still lower value predetermined by the setting of the second adjustable resistor; and automatic switch means under control of the first resistance-sensitive control circuit means, operative by response thereof to the resistance across the contacts dropping to said first predetermined value, to disconnect the first resistance-sensitive control circuit means from the pair of contacts and to connect the second resistance-sensitive control circuit means with said contacts.

References Cited in the file of this patent

UNITED STATES PATENTS

| | | |
|---|---|---|
| 1,912,997 | Parker | June 6, 1933 |
| 2,709,843 | Hartley | June 7, 1955 |
| 2,791,120 | Dietert | May 7, 1957 |
| 2,848,008 | Dietert | Aug. 19, 1958 |
| 2,854,714 | Dietert | Oct. 7, 1958 |
| 2,856,948 | Martin | Oct. 21, 1958 |
| 2,863,191 | Dietert | Dec. 9, 1958 |
| 2,886,868 | Dietert | May 19, 1959 |
| 2,928,406 | Cunniff | Mar. 15, 1960 |
| 2,954,215 | Warmkessel | Sept. 27, 1960 |
| 3,000,065 | Dietert | Sept. 19, 1961 |
| 3,046,623 | Dietert | July 31, 1962 |
| 3,083,423 | Hartley | Apr. 2, 1963 |